United States Patent Office 3,182,912
Patented May 11, 1965

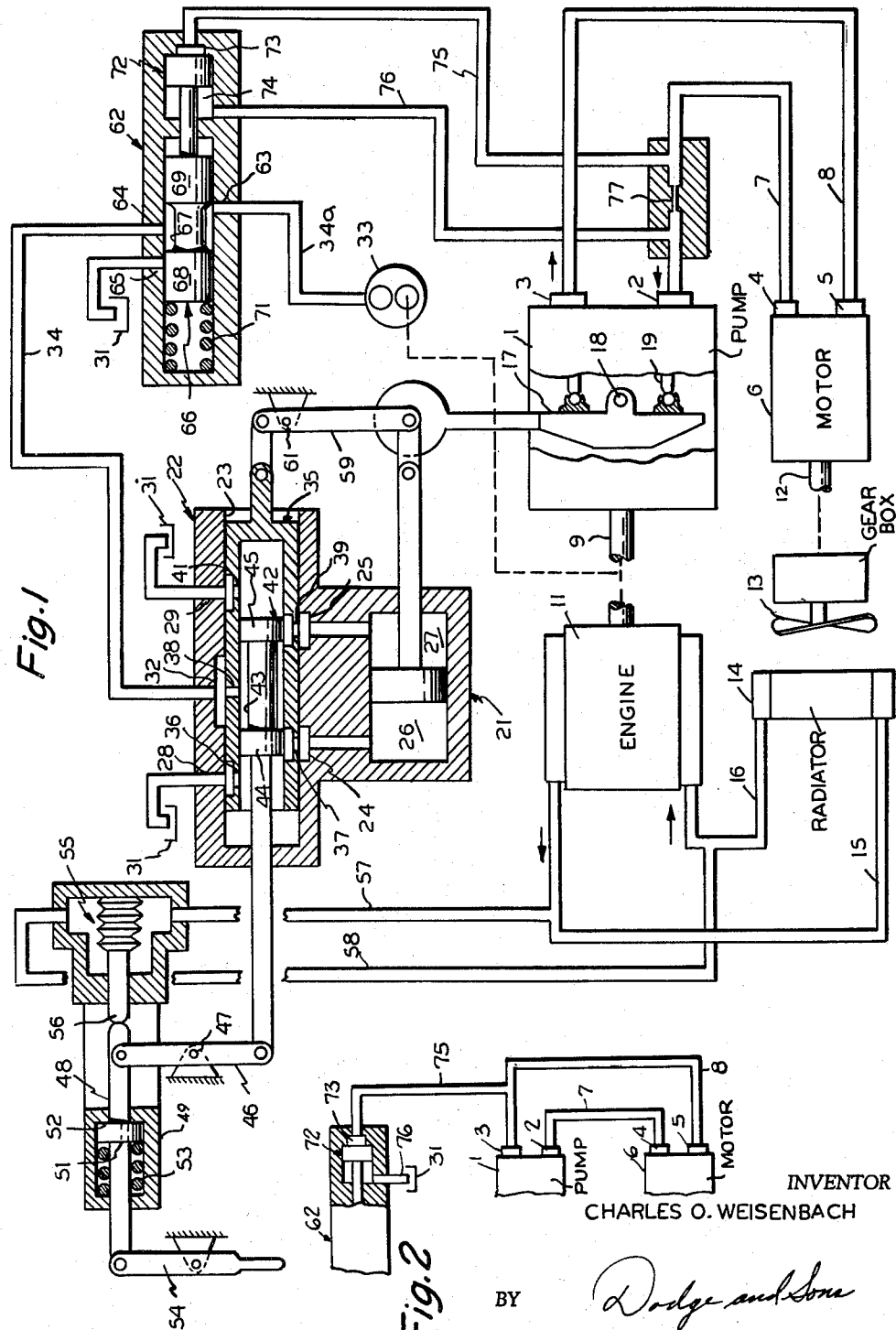

3,182,912
HYDROSTATIC TRANSMISSION CONTROL SYSTEM
Charles O. Weisenbach, Watertown, N.Y., assignor to The New York Air Brake Company, a corporation of New Jersey
Filed May 2, 1963, Ser. No. 277,550
6 Claims. (Cl. 236—35)

This invention relates to hydrostatic transmissions employing hydraulic pumps and motors of the rotary cylinder barrel, longitudinally reciprocating piston type.

In hydraulic units of the type mentioned, the pistons are mounted in a circular series of cylinder bores formed in the cylinder barrel and have projecting ends which bear directly, or indirectly through shoes, on a cam plate that serves to move them on their discharge strokes. The force acting on each piston has a component that is normal to the axis of the piston and which is placed in equilibrium by a reaction force supplied by the wall of the cylinder bore and which acts in the region of a bearing area near its open end. It is recognized in the art that for any given angle of the cam plate, with respect to the axis of rotation, the maximum tolerable magnitude of the reaction force is a function of the product of the pressure in the cylinder bore and the sliding velocity of the piston. Commonly, this product is termed the PV factor, where P is the pressure and V is the sliding velocity.

It is desirable to operate a pump or motor as near as practicable to its allowable PV limit because this results in a unit of minimum size and maximum efficiency. However, when the margin of safety is small, care must be taken that it is not exceeded because otherwise seizure of the pistons might result. When a hydrostatic transmission using components of this type is employed to transmit power from a variable speed prime mover to a fan blade, the problem of maintaining safe PV conditions is particularly acute because the power load imposed by a fan varies with the cube of its speed. Thus, since the pressure in the transmission, and consequently the pressure in the cylinder bores, varies with the square of the speed, a slight overspeed condition could easily result in a PV factor above the allowable limit. One solution to this problem consists in increasing the safety margin, but, since this requires use of larger and less efficient units, it is not satisfactory.

The object of this invention is to provide a hydrostatic transmission fan drive employing hydraulic units of the rotary cylinder barrel, longitudinally reciprocating piston type in which the units can be operated close to their allowable PV limits without risk of malfunction. According to the invention, the transmission includes a variable displacement pump whose displacement control element is positioned automatically by a primary control that responds to changes in a condition, such as the temperature of the medium over which the fan is circulating air. Associated with this primary control is an override control that responds to fan speed and which serves to limit the maximum displacement of the variable displacement unit to a value that produces a predetermined maximum fan speed. This override control may use either the flow rate or the pressure in the transmission circuit as the measure of fan speed, but in any case, the speed of the fan is limited to a value that results in PV factors below the allowable limits for the hydraulic units. In this way, overspeed of the prime mover is precluded from producing intolerable PV factors at both the pump and the motor.

The preferred embodiment of the invention is described herein with reference to the accompanying drawing, in which:

FIG. 1 is a schematic diagram of a hydrostatic transmission employed to drive the cooling fan of the engine of a railway locomotive.

FIG. 2 is a schematic diagram showing a modification of the FIG. 1 circuit.

As shown in FIG. 1, the transmission includes a variable displacement pump 1 having inlet and discharge ports 2 and 3, respectively, which are connected with the discharge and inlet ports 4 and 5, respectively, of a fixed displacement motor 6 by a pair of main conduits 7 and 8. The drive shaft 9 of the pump 1 is connected in driven relation with the locomotive Diesel engine 11, and the drive shaft 12 of the motor is connected, through a gear box, with the cooling fan 13. Fan 13 is arranged to circulate air over the heat exchange surfaces of a radiator 14 through which the engine coolant is led by a pair of conduits 15 and 16.

Both the pump 1 and the motor 6 are of the rotary cylinder barrel, longitudinally reciprocating piston type and the pump 1 includes a cam plate 17 which is angularly adjustable about the axis of trunnion 18 to vary its displacement. The trunnion axis is positioned in the plane of the centers of the spherical heads of pistons 19 so that the reaction forces transmitted between the pistons 19 and the cam plate urge the latter toward the illustrated zero stroke position.

Cam plate 17 is positioned by a double-acting piston motor 21 which is under the control of a servo valve 22. This valve includes a stationary housing containing a valve bore 23 along which are located a pair of outlet chambers 24 and 25 which are connected with the opposed working chambers 26 and 27, respectively, of motor 21, a pair of exhaust ports 28 and 29 which are in continuous communication with reservoir 31, and a central supply chamber 32 which is connected with charge pump 33 through conduits 34 and 34a. Charge pump 33 is driven by engine 11 and, through a conventional circuit (not shown) serves to maintain the transmission circuit 7, 8 liquid-filled. Mounted in valve bore 23 is a sliding valve sleeve 35 formed with five spaced through ports 36, 37, 38, 39 and 41 that register, respectively, with exhaust port 28, chambers 24, 32 and 25, and exhaust port 29. Communication between the through ports is controlled by a reciprocable valve plunger 42 which is mounted in the sleeve 35 and formed with an annular groove 43 and a pair of lands 44 and 45. When the valve plunger is in the illustrated null position with respect to valve sleeve 35, through port 37 communicates with the through ports 36 and 38 across the left and right edges of land 44, and through port 39 communicates with the through ports 38 and 41 across the left and right edges of land 45. Therefore, fluid delivered to supply chamber 32 from charge pump 33 may flow to reservoir 31 along two parallel paths. Although these paths are restricted, the back pressure developed in working chambers 26 and 27 is not sufficient to cause motor 21 to move cam plate 17 against the opposing bias of the reaction forces exerted by pump pistons 19.

The left end of valve plunger 42 is connected with the lower end of a link 46 which is pivoted at 47 and whose upper end is connected to an actuating rod 48. Rod 48 reciprocates in housing 49 and is provided with an enlargement 51, which together with shoulder 52, constitutes a limit stop that defines the neutral position of valve plunger 42. Valve plunger 42 is biased toward this neutral position by a coil compression spring 53 and can be shifted away from it in one direction by either a manual actuator 54 or a temperature responsive actuator 55 whose movable element 56 abuts the end of actuating rod 48. The thermal actuator 55 is located in a branch coolant circuit which is connected in parallel with radiator 14 by a pair of conduits 57 and 58. The thermal actuator 55 is designed to pivot link 46 in the counterclockwise direction about pivot 47 upon an increase in coolant temperature, and this movement shifts valve plunger 42 to the right. Following movement of valve sleeve 35 is effected through a link 59 which is pivoted at 61 and which serves as a follow-up connection between the cam plate 17 and the valve sleeve.

Interposed between conduit 34 and conduit 34a is a speed control valve 62 which is arranged to override servo valve 22 and limit the maximum displacement of pump 1. This valve 62 comprises a housing containing an inlet port 63 connected with conduit 34a, an outlet port 64 connected with conduit 34, an exhaust port 65 connected with reservoir 31 and a sliding valve plunger 66 formed with an annular groove 67 that defines two valve lands 68 and 69. Valve plunger 66 is biased to the right, to a position in which groove 67 interconnects ports 63 and 64 and land 68 blocks port 65, by a coil compression spring 71, and is shifted in the opposite direction, to a position in which groove 67 interconnects ports 64 and 65 and land 69 blocks port 63, by a double-acting piston motor 72. The opposed working chambers 73 and 74 of this motor are connected by conduits 75 and 76 with the main conduit 7 at points upstream and downstream, respectively, of a metering orifice 77.

While metering orifice 77 can be located in either of the conduits 7 and 8, the preferred location in conduit 7 affords certain advantages. In the first place, location of the orifice in the return path from motor 6 results in a more accurate measurement of motor speed because the pressure differential across it depends solely upon the rate of flow through the motor. If the orifice were located in conduit 8, the pressure differential would depend upon the total flow to the motor, and, since a part of this total flow is lost through leakage in the motor, the speed control always would indicate a speed higher than actual speed. Furthermore, since the amount of leakage in the motor varies with operating conditions, the difference between indicated speed and actual speed would not be constant. Second, the pressure pulsations created by pump 1 are dissipated as the fluid travels to and through motor 6 so that they do not adversely affect the performance of the speed control circuit. Finally, since conduit 7 is a low pressure conduit, motor 72 and conduits 75 and 76 are never subjected to the full operating pressure of the transmission.

It is assumed that when the transmission is first put in operation, the engine coolant is cold and that, therefore, thermal actuator 55 permits spring 53 to move enlargement 51 against shoulder 52 and thus place valve plunger 42 in a neutral position with respect to the housing of servo valve 22. At this time, cam plate 17 will be in its zero stroke position and valve sleeve 35 will be in a null position with respect to valve plunger 42. Spring 71 of the speed control valve 62 will hold valve plunger 66 in its illustrated position.

After engine 11 has been running for a short time, the temperature of its coolant will commence to rise and thermal actuator 55 will commence to shift link 46 in the counterclockwise direction about pivot 47. This movement of link 46 causes valve plunger 42 to shift to the right from its neutral position to a position in which groove 43 interconnects through ports 38 and 39 and land 44 blocks communication between ports 37 and 38. Fluid under charge pump pressure now flows to the working chamber 27 of motor 21 through a supply path comprising conduits 34a and 34, supply chamber 32, port 38, plunger groove 43, port 39 and outlet chamber 25. Since working chamber 26 is connected with reservoir 31 through chamber 24, through ports 37 and 36 and exhaust port 28, motor 21 now moves cam plate 17 in the counterclockwise direction about the axis of trunnion 18. This movement of the cam plate causes pump 1 to circulate fluid through the main conduits 7 and 8 in the direction of the arrows, and thus to drive motor 6 and the connected fan 13.

As cam plate 17 moves away from its neutral position under the action of motor 21, the follow-up connection 59 shifts valve sleeve 35 to the right toward a null position with respect to valve plunger 42. When the cooling effect of the air circulated through radiator 14 by fan 13 stabilizes the temperature of the engine coolant, thermal actuator 55, and consequently, valve plunger 42, come to rest and valve sleeve 35 assumes a null position with respect to the valve plunger. At this time, each of the through ports 37 and 39 is again connected with both the charge pump 33 and the reservoir 31 and the pressures in working chambers 26 and 27 tend to equalize. The biasing force exerted on cam plate 17 by pump pistons 19 now tends to return the cam plate to the zero displacement position. However, since movement of the cam plate toward this position is accompanied by leftward movement of valve sleeve 35 relatively to valve plunger 42, working chamber 27 is pressurized as soon as the cam plate leaves the position established by thermal actuator 55 and the cam plate is returned to that position. It is thus seen that the servo control provided for cam plate 17 is basically a position responsive control.

If the temperature of the engine coolant should now increase, thermal actuator 55, through link 46, shifts valve plunger 42 farther to the right and again opens a supply path to the working chamber 27 of motor 21. Therefore, this motor moves cam plate 17 to a greater displacement position and thus increases the speed of motor 6, and of fan 13. The accompanying following movement of sleeve 35 re-establishes a null condition at the servo valve 22 when the temperature of the coolant again stabilizes. If, on the other hand, the temperature of the coolant should decrease, thermal actuator 55 moves to the right and permits spring 53 to move valve plunger 42 to the left from the null position relative to sleeve 35. This movement of the valve plunger closes the supply path to working chamber 27 including through ports 38 and 39 and closes the exhaust path from working chamber 26 including through ports 36 and 37. Therefore, motor 21 and the biasing force acting on cam plate 17 now move the cam plate back toward its zero stroke position. As a result, the speed of motor 6 and of fan 13 decreases. As the cam plate 17 moves in the clockwise direction, the follow-up linkage 59 shifts valve sleeve 35 to the left so that when the coolant temperature again stabilizes, the servo valve 22 will be in a null position.

During the operation of the transmission, the fluid circulating through main conduits 7 and 8 passes through the metering orifice 77 and produces a pressure differential between the working chambers 73 and 74 of motor 72 that is proportional to its rate of flow. This pressure differential develops a shifting force at motor 72 tending to move valve plunger 66 to the left against the opposing bias of spring 71. At the normal operating speeds of engine 11, the speed of motor 6 and of fan 13 does not produce an excessive PV condition even though cam plate 17 may be in its maximum displacement position. Therefore, under these conditions, the shifting force developed by motor 72 is not sufficient to overcome the bias of spring 71. However, during over-speed conditions, the pressure differential created by metering orifice 77 does produce a shifting force that over-powers spring 71 and moves valve plunger 66 to the left causing land 69 to block port 63 and then causing groove 67 to interconnect ports 64 and 65. Blockage of port 63 has the effect of disconnecting valve 22 from charge pump 33, and thus of preventing the temperature responsive circuit from further increasing the displacement of pump 1 (assuming that cam plate 17 is not already in its maximum displacement position). The interconnection of ports 64 and 65, on the other hand, opens an exhaust path from the working chamber 27 of motor 21 to reservoir 31, including outlet chamber 25, through port 39, plunger groove 43, through port 38, supply chamber 32, conduit 34, port 64, plunger groove 67 and port 65, and permits the biasing force acting on cam plate 17 to move that member in the displacement-decreasing direction (i.e., in the clockwise direction about the axis of trunnion 18). As the speed of motor 6 is restored to a safe value by this reduction in pump displacement, the pressure differential orifice 77 decreases and spring 71 commences to move valve plunger 66 back toward the illustrated position. If, when groove 67 again interconnects ports 63 and 64, the temperature control circuit is calling for a higher fan speed, and consequently a greater displacement of pump 1, servo valve 22 will be in its supply position and fluid under pressure will immediately be transmitted to working chamber 27 of motor 21. Therefore, motor 21 will now try to move cam plate 17 in the counterclockwise direction. However, since engine 11 still is operating at an excessive speed, a small increase in pump displacement resulting from this action of motor 21 will immediately produce a pressure differential across orifice 77 sufficient to cause motor 72 to move valve plunger 66 back to the position in which land 69 blocks port 63 and groove 67 opens an exhaust path from working chamber 27. This override action of the speed control will continue as long as the excessive speed condition persists. When engine speed is restored to a normal value, then, as explained previously, spring 71 will hold the speed control valve in the illustrated position and cam plate 17 will again be under the control of the temperature responsive circuit.

It might be mentioned here that the override control action afforded by the speed control circuit limits the PV conditions at the pump 1 and motor 6 in slightly different ways. In the case of the motor, there is only one limiting PV value because this unit is of the fixed displacement type, i.e., its cam plate is not angularly adjustable. Therefore, as far as this unit is concerned, the reduction in pump displacement produced by the speed control insures against exceeding the allowable PV limit by limiting motor speed. In the case of the pump 1, which is a variable displacement unit, there is an allowable PV limit for each angular position of the cam plate and these limits become greater as the cam plate moves toward the zero stroke position. Therefore, as far as the pump is concerned, the displacement-reducing effect of the speed control insures against excessive PV conditions by establishing a smaller cam angle, and thus a higher allowable PV limit, as the driving speed becomes excessive.

During normal operation, that is, when motor 21 is under the control of thermal actuator 55, the operator may select a higher fan speed than that called for by the automatic control simply by moving manual actuator 54 in a direction to cause counterclockwise movement of link 46 about pivot 47. This action shifts valve plunger 42 to the right and, as explained above, opens a supply path to working chamber 27 and an exhaust path from working chamber 26. When this motor has moved the cam plate 17 to a displacement position corresponding to the new position of link 46, valve sleeve 35 will have re-established a null condition at the servo valve 22. Obviously, cam plate 17 will be moved in the displacement-decreasing direction when the operator returns link 46 to the position dictated by thermal actuator 55. Since the manual control operates through the servo valve 22, it will be apparent that, during overspeed conditions, the speed control circuit overrides it in the same manner as the temperature control.

Although the illustrated embodiment uses the rate of flow through the closed transmission circuit as the measure of fan speed, it will be apparent that other arrangements can be employed. For example, speed control valve 62 could be operated by a device, such as a governor, that responds directly to the rotary speed of the fan. Another alternative is to use the pressure in the high pressure conduit 8 as the measure of fan speed. This arrangement can be accomplished simply, as shown in FIG. 2, by deleting metering orifice 77, connecting conduit 76 with reservoir 31, and connecting conduit 75 with main conduit 8. Of course, more elaborate pressure controls, such as those employing mechanism for varying the selected pressure at which motor 72 shifts valve plunger 66 to its vent position in inverse relation to the displacement of pump 1, may be used. Regardless of the method of sensing fan speed, the important consideration is that the speed be limited by limiting pump displacement so that an intolerable PV condition is created at neither the pump nor the motor.

As stated previously, the drawing and description relate only to preferred embodiment of the invention. Since changes can be made in the structure of this embodiment without departing from the inventive concept, the following claims should provide the sole measure of the scope of the invention.

What I claim is:
1. In combination
(a) a hydrostatic transmission including a motor and a variable displacement pump, connected in a closed circuit, both the pump and the motor being of the rotary cylinder barrel, longitudinally reciprocating piston type;
(b) a fan connected with the motor;
(c) a variable speed prime mover connected with the pump;
(d) first means responsive to changes in a condition for varying the displacement of the pump to thereby increase and decrease fan speed; and
(e) override means responsive to fan speed for overriding the first means and limiting the displacement of the pump to a predetermined maximum value.

2. In combination
(a) a hydrostatic transmission including a hydraulic motor and a variable displacement hydraulic pump connected in a closed circuit, both the pump and the motor being of the rotary cylinder barrel, longitudinally reciprocating piston type;
(b) a cooling system, including a fan connected with the hydraulic motor, for circulating a fluid in heat exchange relationship with a medium whose temperature is to be controlled;
(c) a variable speed prime mover connected with the hydraulic pump;
(d) means responsive to the temperature of the medium for varying pump displacement in direct relation to medium temperature; and
(e) override means responsive to the speed of the fan for limiting pump displacement to a predetermined maximum value.

3. The combination defined in claim 2 in which the override means includes means responsive to the rate of flow in said closed circuit and serves to limit pump displacement when the rate of flow exceeds a predetermined maximum.

4. In combination
(a) a hydrostatic transmission including a pair of hydraulic units connected in a closed circuit, one of said units being a motor and the other being a variable displacement pump having a displacement control member movable between minimum and maximum displacement positions and being biased toward the minimum displacement position, both units being of the rotary cylinder barrel, longitudinally reciprocating piston type;
(b) a cooling system, including a fan connected with the motor, for circulating a fluid in heat exchange relation with a medium whose temperature is to be controlled;
(c) a variable speed prime mover connected with the hydraulic pump;

(d) fluid pressure motor means connected with the displacement control member for moving same toward the maximum displacement position;
(e) a source of control pressure and a reservoir;
(f) servo control means connected with the source, the reservoir and the motor means and responsive to the temperature of the medium, the servo control means serving to connect the motor means with the source and the reservoir as medium temperature rises above and falls below, respectively, a certain value and to connect the motor means with both the source and the reservoir when medium temperature is at said certain value; and
(g) override means responsive to fan speed and interposed between the servo control means and the source, said override means serving to connect the servo control means with the source when fan speed is below a predetermined maximum and to connect the servo control means with the reservoir when fan speed exceeds said maximum.

5. The combination defined in claim 4 in which the override means includes means responsive to the rate of flow in said closed circuit and utilizes this quantity as a measure of fan speed.

6. The combination defined in claim 4 in which the override means includes means responsive to the operating pressure in said closed circuit and utilizes this quantity as a measure of fan speed.

References Cited by the Examiner
UNITED STATES PATENTS

| | | | |
|---|---|---|---|
| 2,777,287 | 1/57 | Tweedale | 236—35 X |
| 2,855,909 | 10/58 | Stefan | 236—35 X |

OTHER REFERENCES

Damiler-Bentz: German printed application No. 1,101,051, 3/51.

EDWARD J. MICHAEL, *Primary Examiner.*